United States Patent
Tsuei

(10) Patent No.: US 8,140,123 B2
(45) Date of Patent: Mar. 20, 2012

(54) METHOD FOR DISPLAYING SPEED DIAL SETTINGS AND MOBILE COMMUNICATION DEVICE USING THE METHOD

(75) Inventor: Yuan-Mao Tsuei, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 725 days.

(21) Appl. No.: 12/285,280

(22) Filed: Oct. 1, 2008

(65) Prior Publication Data

US 2009/0111436 A1    Apr. 30, 2009

(30) Foreign Application Priority Data

Oct. 25, 2007 (TW) ................................ 96140015 A

(51) Int. Cl.
*H04Q 7/32* (2006.01)

(52) U.S. Cl. .................. 455/564; 455/550.1; 455/575.1; 455/412.1; 455/412.2; 455/90.3; 379/352; 379/355.01; 379/355.02; 379/355.03; 379/355.04

(58) Field of Classification Search .................. 455/564, 455/550.1, 90.1–90.3, 412.1, 412.2, 575.1; 379/352, 355.01–355.06

See application file for complete search history.

(56) References Cited

U.S. PATENT DOCUMENTS

| 2005/0190196 | A1* | 9/2005 | O'Neil et al. ................. 345/589 |
| 2007/0116247 | A1 | 5/2007 | Chung et al. |
| 2007/0265032 | A1* | 11/2007 | Aisenberg .................. 455/556.1 |
| 2008/0107253 | A1* | 5/2008 | Gupta ..................... 379/216.01 |

FOREIGN PATENT DOCUMENTS

| CN | 1665251 | 9/2005 |
| CN | 201114284 | 9/2008 |
| JP | 2003-115915 | 4/2003 |

* cited by examiner

*Primary Examiner* — Keith Ferguson

(74) *Attorney, Agent, or Firm* — Birch, Stewart, Kolasch & Birch, LLP

(57) ABSTRACT

A method for displaying speed dial settings is disclosed. The method is used for a mobile communication device, comprising the steps: detecting whether a speed dial setting operation is implemented to a button of a keypad of a mobile communication device, and displaying an indicator for the button if the speed dial setting operation is detected.

15 Claims, 3 Drawing Sheets

METHOD FOR DISPLAYING SPEED DIAL SETTINGS AND MOBILE COMMUNICATION DEVICE USING THE METHOD

CROSS REFERENCE TO RELATED APPLICATIONS

This application claims priority of Taiwan Patent Application No. 96140015, filed on Oct. 25, 2007, the entirety of which is incorporated by reference herein.

DESCRIPTION OF THE RELATED ART

"Speed Dial" (or Abbreviated Dial) enables users to store frequently used phone number on each button of a keypad of a mobile communication device. Usually, the user may store totally ten phone numbers for buttons 0 to 10 of the keypad. When the phone numbers have been stored for a button, the user may press the button (a speed dial button) for a period of time to dial the phone number assigned to the pressed button, allowing for time savings and convenience.

However, when a speed dial number was just assigned to a button lately or if some speed dial buttons are not frequently used, users may probably forget which phone numbers are assigned to which speed dial buttons. Thus, the invention provides a speed dialing method for displaying contact information.

BRIEF SUMMARY

The disclosure provides methods for displaying speed dial settings. An exemplary embodiment of a method for displaying speed dial settings comprises the following steps: detecting whether a speed dial setting operation is implemented to a button of a keypad of a mobile communication device, and displaying an indicator for the button if the speed dial setting Operation is detected.

The disclosure further provides mobile communication devices. An exemplary embodiment of a mobile communication device comprises a keypad and a microcontroller. The keypad comprises plural buttons. The microcontroller applies an indicator to a button if a speed dial setting operation is implemented to the button.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1B:
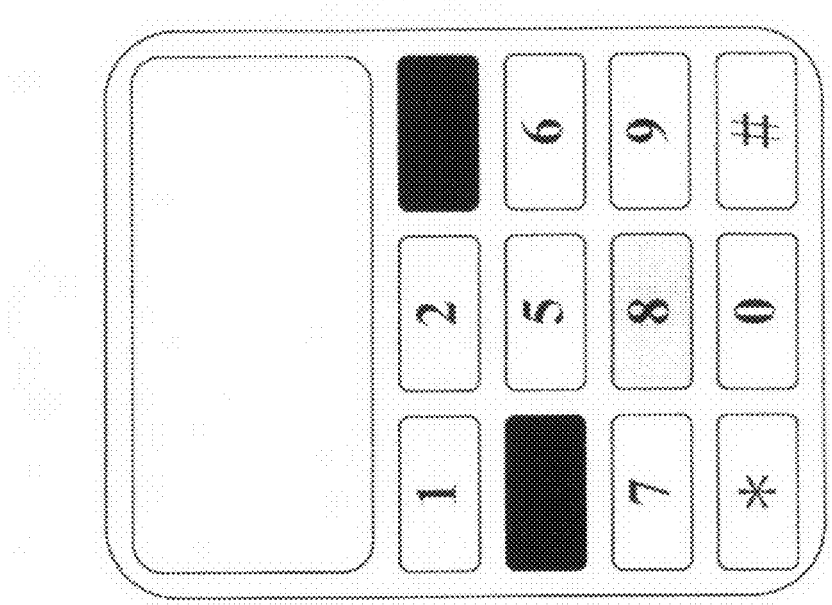
FIG. 1A~1D are schematic views of displaying speed dial settings of the present invention.

Several exemplary embodiments of the disclosure are described with reference to FIGS. 1A through 3, which generally relate to speed dialing for a mobile communication device. It is to be understood that the following disclosure provides various different embodiments as examples for implementing different features of the disclosure. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The disclosure discloses a method for displaying speed dial settings and a mobile communication device using the method.

Figure 1A:
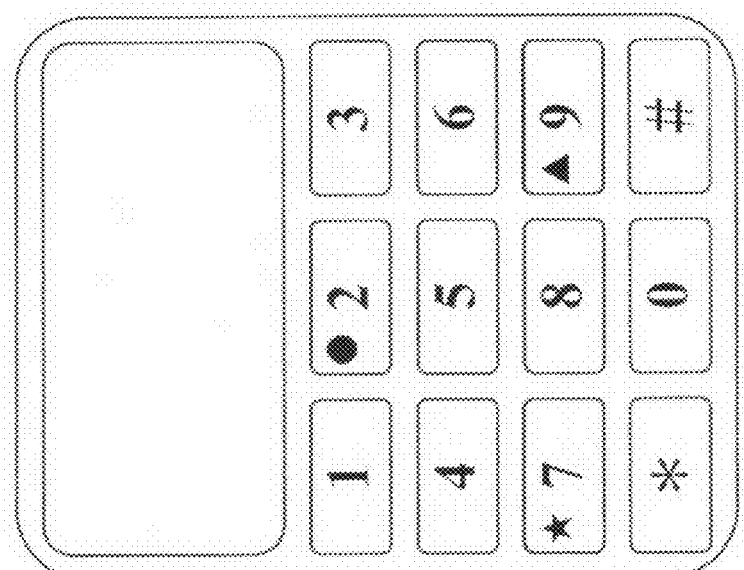

In an embodiment, a method for displaying speed dial settings is used for reminding users which button on a mobile communication device, for example, but not limited to, a cellular phone, a personal digital assistant (PDA) phone, a smart phone, etc, has been set as a speed dial button by displaying an indicator. In an embodiment, when a button has been set as a speed dial button, a preset pattern, for example, but not limited to, an icon, an image, a character, a word, etc, or a preset color used as an indicator is displayed on or around the button. Referring to FIG. 1A, for example, buttons "2," "7," and "9" are set as speed dial buttons, so a circle, an asterisk, and a triangle are respectively displayed on the buttons. Thus, users can clearly recognize that buttons "2," "7," and "9" have been set as speed dial buttons. It should be noted that the method for displaying preset patterns or colors on defined buttons can be implemented by software and is applicable to a soft (virtual) keypad capable of touch sensitive function. It should be noted that the patterns or colors for the speed dial buttons can be different patterns or colors or the same patterns or colors in this embodiment.

Figure 1D:
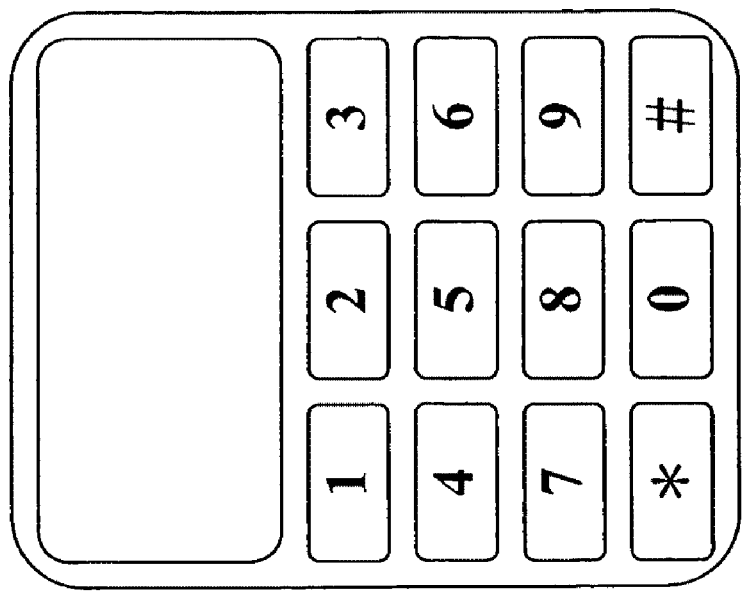
Figure 1C:
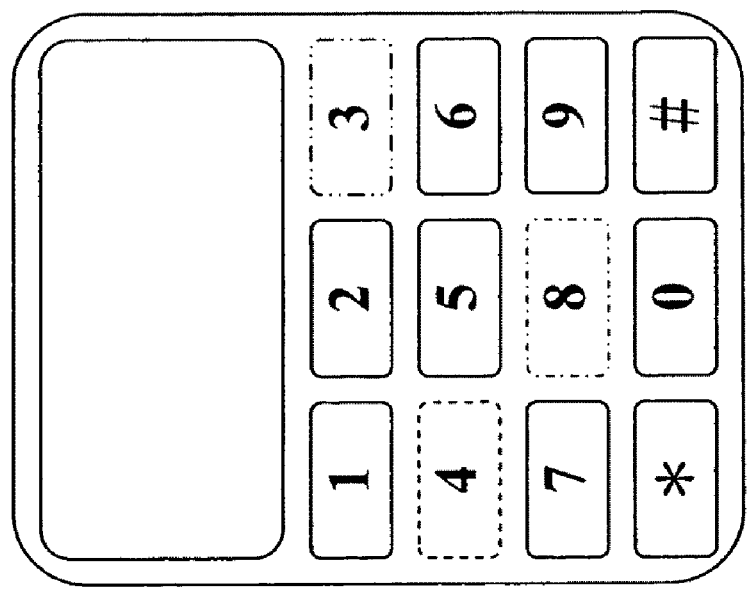

In an embodiment, when a button has been set as a speed dial button, a portion around the number, except the number, on the button displays the indicator, for example, but not limited to, the present pattern or the preset color. In another embodiment, when a button has been set as a speed dial button, the number on the button displays the indicator for example, but not limited to, the preset color. Referring to FIG. 1B, for example, buttons "3," "4," and "8" are set as speed dial buttons, so the portions around the numbers on the buttons display red, blue, and pink colors, respectively. Referring to FIG. 1C, buttons "3," "4," and "8" are set as speed dial buttons, so the portions around the buttons display red, blue, and pink colors, respectively. Referring to FIG. 1D, buttons "3," "4," and "8" are set as speed dial buttons, so the numbers on the buttons display red, blue, and pink colors, respectively. Thus, users can clearly recognize that buttons "3," "4," and "8" have been set as speed dial buttons. In still another embodiment, when a button has been set as a speed dial button, a portion around the button displays the indicator, for example, but not limited to, the present pattern or the preset color.

In addition, in an embodiment, when a button has been set as a speed dial button, a portion around a number on the button and the number display different preset colors, respectively.

It should be noted that the method for displaying preset colors on the portions around the numbers on the speed dial buttons, on the numbers on the speed dial buttons, or on the portions around the speed dial buttons can be implemented by software or hardware. If implemented by software, the method is applicable to a keypad capable of touch sensitive function. If implemented by hardware, the method is applicable to mobile communication devices comprising a physical (hardware) keypad, where light-emitting components for example, but not limited to, light emitting diodes (LED), organic light, emitting diodes (OLED), and the like, are installed under the physical keypad. Additionally, it should be noted that, the portions around the numbers on the speed dial buttons, the numbers on the speed dial buttons, or the portions around the speed dial buttons may display different or the same colors.

In an embodiment, the indicator may be contact information of the contact or phone number set to the speed dial button. The contact information is, for example, but not limited to, a phone number, the name of a contact, the first name of a contact, the last name of a contact, the phone number of a contact, or a code name of a contact edited by the user when set the speed dial button.

In an embodiment, the method of the disclosure can be achieved by using the techniques comprising the techniques for making an object translucent such as alpha blending, texture mapping, and the like, or the techniques for overlapping displaying such as JAVA script, cascading style sheets (CSS), and the like, if the keypad is a soft keypad.

Figure 2:
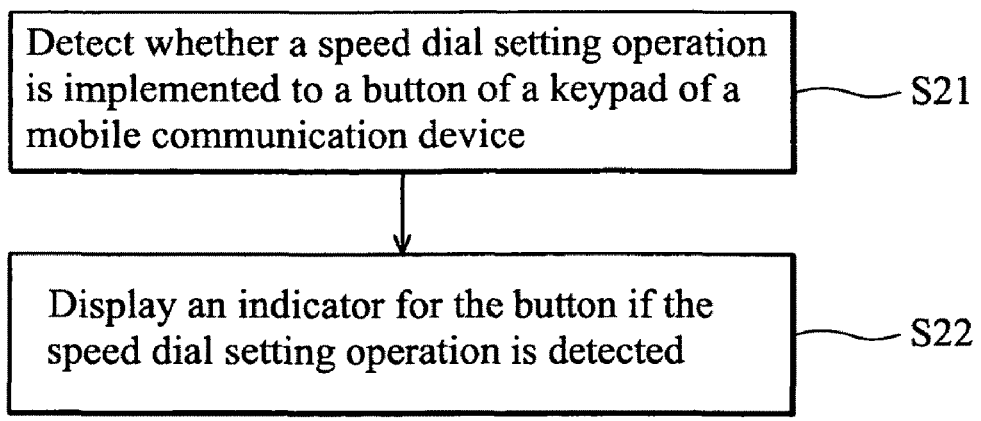
FIG. 2 is a flowchart of a method for displaying speed dial settings of the present invention.

FIG. 2 is a flowchart of a method for displaying speed dial settings of the present invention.

In Step S21, whether a speed dial setting operation is implemented to a button of the keypad of the mobile communication device is detected. In Step S22, if the speed dial setting operation is detected, that is the button has been set as a speed dial button, then an indicator is applied to the button. In an embodiment, the indicators are the same, and, in another embodiment, are different.

In an embodiment, when a button has been set as a speed dial button, a portion around the number, except the number, on the button displays the indicator, for example, but not limited to, the present pattern or the preset color. In another embodiment, when a button has been set as a speed dial button, the number on the button displays the indicator for example, but not limited to, the preset color. Referring to FIG. 1B, for example, buttons "3," "4," and "8" are set as speed dial buttons, so the portions around the numbers on the buttons display red, blue, and pink colors, respectively. Referring to FIG. 1C, buttons "3," "4," and "8" are set as speed dial buttons, so the portions around the buttons display red, blue, and pink colors, respectively. Referring to FIG. 1D, buttons "3," "4," and "8" are set as speed dial buttons, so the numbers on the buttons display red, blue, and pink colors, respectively. Thus, users can clearly recognize that buttons "3," "4," and "8" have been set as speed dial buttons. In still another embodiment, when a button has been set as a speed dial button, a portion around the button displays the indicator, for example, but not limited to, the present pattern or the preset color.

In addition, in an embodiment, when a button has been set as a speed dial button, a portion around a number on the button and the number display different preset colors, respectively.

In an embodiment, the method for displaying speed dial settings further comprises a step of defining an indicator for a button of the keypad of the mobile communication device. The indicators defined for the buttons are the same or different.

In an embodiment, after the step of defining an indicator for a button of the keypad of the mobile communication device, the method further comprises a stop of storing the defined indicators in a memory of the mobile communication device. The relationships between the indicators and the buttons of the keypad are recorded in a definition list stored in the memory of the mobile communication device.

Figure 3:
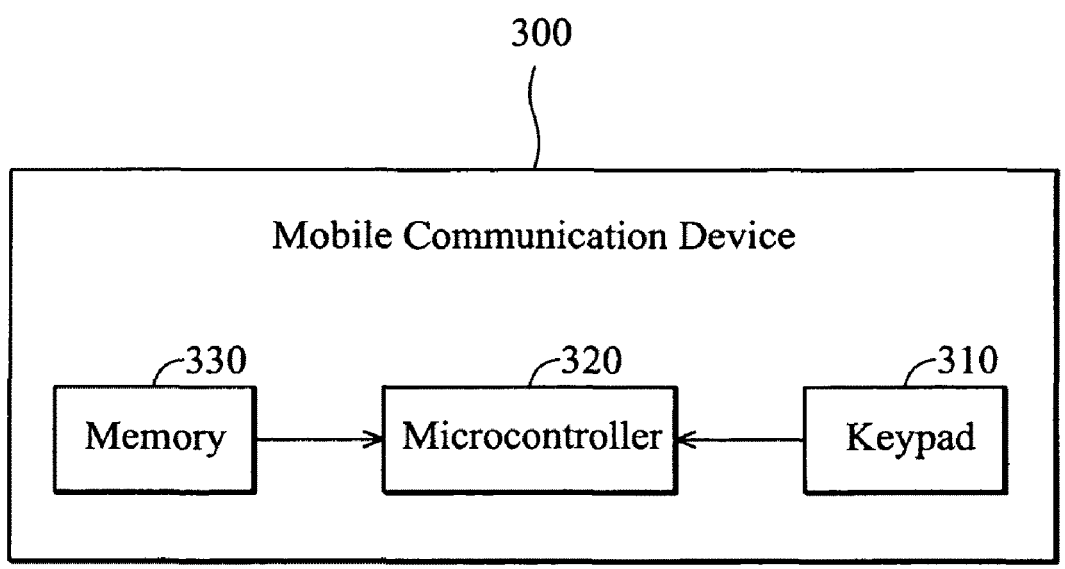
FIG. 3 is a schematic view of a mobile communication device of the present invention.

FIG. 3 is a schematic view of a mobile communication device of the present invention.

Mobile communication device 300 of the disclosure comprises a keypad 310 and a microcontroller 320. Keypad 310 comprises plural buttons. Microcontroller 320 displays an indicator for a button if a speed dial setting operation is implemented to the button.

In an embodiment, Mobile communication device 300 further comprises a memory 330 for storing a definition list recording relationships between the buttons of keypad 310 and corresponding defined indicators.

In an embodiment, the keypad is a soft keypad (virtual keypad). In another embodiment, the keypad is a physical keypad (hardware keypad).

In an embodiment, the keypad is a dial keypad.

In an embodiment, the button is a number button.

Methods of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for displaying speed dial settings, comprising:
   detecting whether a speed dial setting operation is implemented to a button of a dial keypad of a mobile communication device; and
   displaying an indicator for the button if the speed dial setting operation is detected,
   wherein the indicator is a preset pattern with preset color; and
   wherein after the button is set as a speed dial button, the indicator is displayed around the button or displayed on a portion around the button.

2. The method for displaying speed dial settings as claimed in claim 1, before the step of detecting whether the speed dial setting operation is implemented to the button of the dial keypad of the mobile communication device, the method further comprising a step of defining the indicator for the button of the dial keypad of the mobile communication device.

3. The method for displaying speed dial settings as claimed in claim 2, after the step of defining the indicator for the button of the dial keypad of the mobile communication device further comprising a step of storing the indicator in a memory of the mobile communication device.

4. The method for displaying speed dial settings as claimed in claim 3, wherein:
   in the step of defining the indicator for the button, different indicators are defined for each button of the dial keypad, and relationships between the indicators and the buttons of the dial keypad are stored in a definition list; and the step of displaying the indicator for the button further comprising a step of determining an indicator corresponding to the button according to the definition list.

5. The method for displaying speed dial settings as claimed in claim 1, wherein the indicator for the buttons of the dial keypad are the same.

6. The method for displaying speed dial settings as claimed in claim 1, further comprising a step of displaying contact information of the contact set to the speed dial button, wherein the contact information comprising a phone number, the name of a contact, the first name of a contact, the last name of a contact, the phone number of a contact, or a code name of a contact.

7. A mobile communication device, comprising:
a dial keypad, comprising plural buttons; and
a microcontroller for displaying an indicator for a button if a speed dial setting operation is implemented to the button
wherein the indicator is a preset pattern with preset color; and
wherein after the button is set as a speed dial button, the microcontroller displays the indicator around the button or on a portion around the button.

8. The mobile communication device as claimed in claim 7, further comprising:
a memory for storing the indicator corresponding to the button.

9. The mobile communication device as claimed in claim 8, wherein the indicators for the buttons of the dial keypad are different, the relationships between the indicators and the buttons are stored in a definition list, and the definition list is stored in the memory.

10. The mobile communication device as claimed in claim 7, wherein the indicators for the buttons of the dial keypad are the same.

11. The mobile communication device as claimed in claim 7, wherein the microcontroller further displays an icon, an image, a character, or a word on or around the button.

12. The mobile communication device as claimed in claim 7, wherein the microcontroller further displays contact information of the contact set to the speed dial button, wherein the contact information comprising a phone number, the name of a contact, the first name of a contact, the last name of a contact, the phone number of a contact, or a code name of a contact.

13. The mobile communication device as claimed in claim 7, wherein the dial keypad is a soft keypad or a physical keypad.

14. The mobile communication device as claimed in claim 7, wherein the button is a number button.

15. A computer-readable storage medium containing instructions for performing a method for displaying speed dial settings, comprising:
detecting whether a speed dial setting operation is implemented to a button of a dial keypad of a mobile communication device;
displaying an indicator for the button if the speed dial setting operation is detected;
wherein the indicator is a preset pattern with preset color; and
wherein after the button is set as a speed dial button, the indicator is displayed around the button or displayed on a portion around the button.

* * * * *

UNITED STATES PATENT AND TRADEMARK OFFICE
CERTIFICATE OF CORRECTION

| | | |
|---|---|---|
| PATENT NO. | : 8,140,123 B2 | |
| APPLICATION NO. | : 12/285280 | |
| DATED | : March 20, 2012 | |
| INVENTOR(S) | : Yuan-Mao Tsui | |

It is certified that error appears in the above-identified patent and that said Letters Patent is hereby corrected as shown below:

Title Page, Item (12), "Tsuei" should read -- Tsui --.

Title Page, Item (75), Inventor should read as follows: -- Yuan-Mao Tsui, Taoyuan County (TW) --.

Signed and Sealed this
Fifteenth Day of May, 2012

David J. Kappos
*Director of the United States Patent and Trademark Office*